(12) United States Patent
Hanrot

(10) Patent No.: US 8,119,732 B2
(45) Date of Patent: Feb. 21, 2012

(54) WATER-SOLUBLE ADHESIVE

(75) Inventor: Aline Hanrot, Clidry (FR)

(73) Assignee: 3M Innovative Properties Company, St. Paul, MN (US)

( * ) Notice: Subject to any disclaimer, the term of this patent is extended or adjusted under 35 U.S.C. 154(b) by 672 days.

(21) Appl. No.: 12/296,436

(22) PCT Filed: Apr. 11, 2007

(86) PCT No.: PCT/US2007/066357
§ 371 (c)(1),
(2), (4) Date: Oct. 8, 2008

(87) PCT Pub. No.: WO2007/124272
PCT Pub. Date: Nov. 1, 2007

(65) Prior Publication Data
US 2009/0176115 A1    Jul. 9, 2009

(30) Foreign Application Priority Data
Apr. 19, 2006   (GB) .................................. 0607626.9

(51) Int. Cl.
*C08L 79/00* (2006.01)
(52) U.S. Cl. ...................... 524/612; 427/207.1; 427/411
(58) Field of Classification Search ............... 427/207.1, 427/411; 524/612
See application file for complete search history.

(56) References Cited

U.S. PATENT DOCUMENTS

| | | | |
|---|---|---|---|
| 4,113,674 A * | 9/1978 | Miller et al. | 524/36 |
| 4,436,789 A * | 3/1984 | Davis et al. | 428/537.5 |
| 4,436,867 A | 3/1984 | Pomplun et al. | |
| 4,522,967 A | 6/1985 | Sheldon et al. | |
| 5,300,602 A | 4/1994 | Arita et al. | |
| 5,565,268 A | 10/1996 | Zajaczkowski | |
| 5,980,690 A | 11/1999 | Warchol et al. | |
| 2003/0102080 A1 | 6/2003 | Mallik | |

FOREIGN PATENT DOCUMENTS

| | | |
|---|---|---|
| JP | 63-317575 | 12/1988 |
| JP | 2-139059 | 5/1990 |
| JP | 3-121180 | 5/1991 |

* cited by examiner

*Primary Examiner* — Peter Szekely
(74) *Attorney, Agent, or Firm* — Trisha D. Adamson; Lisa P. Fulton

(57) ABSTRACT

In one aspect, the invention provides a method of applying an adhesive to a paper substrate, the method comprising applying a liquid, water-soluble adhesive composition to the paper substrate, said liquid, water-soluble adhesive composition comprising an adhesive polymer dissolved in water and said adhesive polymer comprising a polyethyloxazoline. In another aspect, the invention also provides A liquid, water-soluble adhesive composition comprising adhesive polymer dissolved in water, wherein the adhesive polymer comprises one or more polyethyloxazolines in an amount of more than 50 wt % and up to 70 wt % based on the total weight of the water-soluble adhesive composition.

11 Claims, 3 Drawing Sheets

WATER-SOLUBLE ADHESIVE

CROSS REFERENCE TO RELATED APPLICATIONS

This application is a national stage filing under 35 U.S.C. 371 of PCT/US2007/066357, filed Apr. 11, 2007, which claims priority to GB Application No. 0607626.9, filed Apr. 19, 2006, the disclosure of which is incorporated by reference in their entirety herein.

The invention relates to a liquid, water-soluble adhesive, comprising an adhesive polymer dissolved in water. In particular the invention relates to a water-soluble adhesive that when applied to a paper substrate does not cause the paper to wrinkle or at least such wrinkling is minimized.

Adhesives for home activities can be split into two categories: solvent-based adhesives and water-based adhesives. Unless specific performances are required, such as water-resistance or outside usage, water-based adhesives are often preferred to solvent-based adhesives as they are more environmentally friendly.

Water-based adhesives may be prepared by emulsifying a polymer in water, typically ethylene/vinyl alcohol copolymers or polyvinyl acetate, or by dissolving a polymer in water, typically polyvinylpyrrolidone or polyvinyl alcohol, etc.

One disadvantage of the emulsion process is that the adhesive is generally not transparent. Although the adhesive dries to form a clear film, this film is not soluble in water, which means that the adhesive generally cannot be easily washed off clothes or substrates. As such, these adhesives are perceived as dirty to use, and children are generally discouraged to use them.

Although the homogenous medium in the dissolving process provides for a transparent water-based adhesive, the thickener properties of the polymer used make the adhesive very viscous, even at low solids content such as 12-20 wt %.

Therefore, when used on paper, a common substrate in home usage, the adhesive's very low solid content and very high water content causes the paper to wrinkle. This distortion stays visible even after the paper has dried. For this reason, water-soluble adhesive does not provide for a precise and clean attachment when used on paper. Furthermore, when used in a notebook, the distortion will be visible from one page to another. As a consequence, children do not use liquid adhesives. Moreover, water-soluble adhesive is unsuitable when a precise application is required, for example scrap booking, as the wrinkles ruin the overall image and disappoint the user.

It would thus be desirable to find a further adhesive composition that does not have one or more of the above-mentioned shortcomings of adhesives known in the art. In particular, it is desirable to find a liquid water-soluble adhesive composition that does not cause a paper substrate to wrinkle or at least such wrinkling would be minimal. Desirably, the adhesive has good or excellent adhesive properties and can be produced in easy and cost effective way. Desirably, the adhesive can be used in home or school activities and/or may be used where clean and precise attachment is desired. Furthermore, it may be desirable to find an adhesive composition that can be delivered to an applicator having small nozzles.

In one aspect, the invention provides a method of applying an adhesive to a paper substrate, the method comprising applying a liquid, water-soluble adhesive composition to the paper substrate, said liquid, water-soluble adhesive composition comprising an adhesive polymer dissolved in water and said adhesive polymer comprising a polyethyloxazoline.

It has been found that the adhesive composition used in the method generally does not cause wrinkling of the paper substrate or alternatively the amount of wrinkling is small. Typically, the adhesive composition can be produced easily and in a cost effective way. Generally, the adhesive can be delivered through applicators with a small nozzle. The adhesive generally has good adhesive properties and is particularly suitable for adhering a paper substrate to other substrates including paper.

In another aspect, the invention also relates a liquid, water-soluble adhesive composition comprising adhesive polymer dissolved in water, wherein the adhesive polymer comprises one or more polyethyloxazolines in an amount of more than 50 wt % and up to 70 wt % based on the total weight of the water-soluble adhesive composition.

In one embodiment, the polyethyloxazoline comprises one or more poly(2-ethyl-2-oxazoline) polymer, such as a mixture of two or more poly(2-ethyl-2-oxazoline) polymers with different molecular weights.

The invention further relates to a product comprising an adhesive dispenser that contains a liquid, water-soluble adhesive as hereinbefore defined.

The invention further relates to a method of producing a liquid, water-soluble adhesive as hereinbefore defined, which method comprises dissolving one or more polyethyloxazolines in water, such that the polyethyloxazolines are added so as to be present in the liquid, water-soluble adhesive composition in an amount of over 50 and up to 70 wt % based on the total weight of water-soluble adhesive composition.

DETAILED DESCRIPTION OF THE INVENTION

Figure 1A:
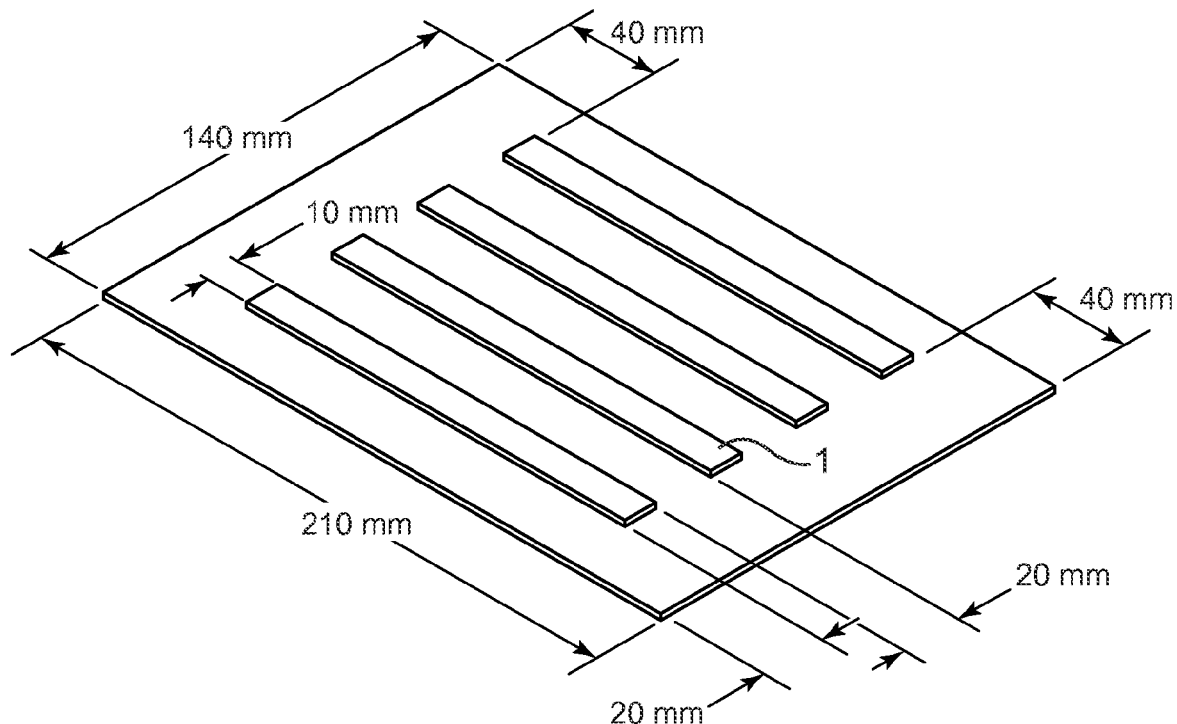
FIG. 1 shows a graphical representation of the wrinkle evaluation protocol as herein described.

Poly(2-ethyl-2-oxazoline) (PEOX; polymers having the formula (I) below:

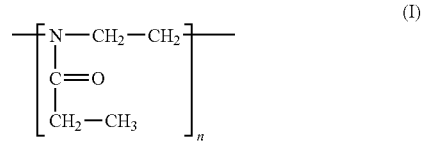

are commercially available (Sigma Aldrich) under the name Aquazole™ in a variety of differing molecular weights. For example, Aquazole™ 5 has a molecular weight of 5,000 Da (hereinafter referred to as AQ5), Aquazole™ 50 has a molecular weight of 50,000 Da (hereinafter referred to as AQ50), Aquazole™ 200 has a molecular weight of 200,000 Da (hereinafter referred to as AQ200) and Aquazole™ 500 has a molecular weight of 500,000 Da (hereinafter referred to as AQ500). The term "AQ polymers" is used herein not only to generically refer to each of the AQ polymers (AQ5, AQ50, AQ200 and AQ500) but generally also to polyethyloxazoline polymers of formula (I).

Surprisingly, we have found adhesives containing AQ polymers to demonstrate excellent adhesion properties when applied to a paper substrate while only slightly wrinkling or distorting the paper substrate, unlike adhesives containing conventional polymers. Furthermore, the adhesives are clean to use and because of the minimal wrinkling and distortion caused, the adhesive may be used in precise applications (such as paper crafting).

It will be appreciated that references to "wrinkling" generally refer to the distortion of a paper substrate when subjected to treatment with a water based product (e.g. a water-soluble adhesive). Thus, the term wrinkle may equally be replaced with distort, deform, crease, crumple, fold, furrow, rumple, pucker, curl, cause to curve and the like and each of these terms will be considered as interchangeable.

AQ polymers also have the advantage of possessing low viscosity which allows the adhesives to be formulated with a high concentration of polymer. Thus, in one embodiment, the polyethyloxazoline is present in the adhesive at a level of 30 wt % or more. In a further embodiment, the polyethyloxazoline is present in the adhesive at a level of any one of 30, 45, 50, 50.5, 51 or 52 wt % to any one of 56, 57, 58, 60, 65 wt % or 70 wt %. In a particular embodiment, the polyethyloxazoline is present at a level of from 30 to 65 wt %, 45 to 65 wt %, 50 to 60 wt %, 50.5 to 60 wt %, 51 to 58 wt %, 52 to 57 wt % or 52 to 56 wt %.

Adhesives containing high solid contents of AQ polymers (e.g. 52 to 65 wt %) have advantageously been found to result in extremely low degrees of wrinkling.

In one embodiment, the polyethyloxazoline has a molecular weight of 500,000 Da or less. In a further embodiment, the polyethyloxazoline has a molecular weight of 200,000 Da or less, such as 50,000 Da or less (e.g. 5,000 to 50,000 Da).

Adhesives containing AQ polymers with low molecular weights (e.g. 5,000 to 50,000 Da) have advantageously been found to prevent wrinkling of paper during and after complete drying. Low molecular weight AQ polymers also have the advantage of retaining low viscosity properties even when containing a high solids content.

It will be appreciated that the adhesive dispenser may comprise any container suitable for holding the adhesive of the invention. In one embodiment, the dispenser has a nozzle for dispensing the adhesive. In a further embodiment, the nozzle has a flat surface which has the advantage of allowing application of the dispensed adhesive onto a flat surface.

In a further embodiment, the nozzle of the adhesive dispenser has a perforation of from 0.5 to 3 mm (e.g. 1.5 to 2 mm) for dispensing the adhesive. If the perforation is larger than 3 mm then an excess of adhesive is applied on the paper substrate. This creates a disadvantage that the drying time of the adhesive is increased. Furthermore, when two substrates are glued, excessive adhesive will flow out from between the substrates. The small perforation (e.g. 1.5 to 2 mm) provides the advantage of ensuring that a suitable quantity of glue is applied on the paper substrate and ensures that the adhesive can be used in high skill artwork. This embodiment, may provide the advantage of creating less spillages which allow safe and clean use by children and infants.

In one embodiment, the adhesive has a viscosity of from 5,000 to 50,000 MPa·s. In a further embodiment, the adhesive has a viscosity of from 5,000 to 35,000 MPa·s, such as 5,000 to 15,000 MPa·s. AQ polymers with low viscosities (e.g. 5,000 to 15,000 MPa·s) advantageously provide a beneficial flow of adhesive through the small perforations of nozzles.

The liquid, water-soluble adhesive composition is typically used to glue or adhere a paper substrate to another substrate. The paper substrate can be any paper substrate including sheets of paper, paper in roll form, card-board etc. . . . In a particular embodiment, the adhesive can be applied to paper having a weight between 40 g/m$^2$ and 200 g/m$^2$, for example between 60 g/m$^2$ and 120 g/m$^2$. The paper substrate may be opaque as well as translucent, such as for example tracing paper, and may be white or colored. Suitable substrates to which the paper substrate may be glued using the adhesive composition include for example other paper substrates, plastic sheets, metal substrates, wood and walls, including walls covered with wall paper.

EXAMPLES

Materials Used

Vinyl Acetate/Vinyl Pyrrolidone copolymer (hereinafter referred to as PVP/VA) was obtained from International Speciality Products Europe, Waterfield, Tadworth, Surrey, KT20 5HQ, UK as product PVP/VA W735.

Polyacrylamides (hereinafter referred to as PAM) were obtained from SNF S.A.S., ZAC de Milieux, 42163 Andrezieux Cedez, France as product DP/MD2237A.

Polyvinylpyrrolidone (hereinafter referred to as PVP) was obtained from BASF Aktiengesellschaft, Functional Polymers Division, New Business Development, ED/N-H201, 67056 Ludwigshafen, Germany as product Luviskol K30 and Luviskol K115.

Polyvinyl alcohol (hereinafter referred to as PVA) was obtained from Celanese Chemicals Europe GmbH, Frankfurter Strasse 111, D-61476 Kronberg/Ts as product CELVOL 205.

Adhesion Measurement Protocol

Adhesion was measured by peeling at 180° C. of "Cotton Ref T79" (supplied by DMR Rubans SA, 16, Rue Carnot, 59759 Comines, France), on the following substrates: wood; aluminium; polypropylene (PP); poly methyl methacrylate (PMMA); polyvinyl chloride (PVC); glass and cotton.

A piece of 25 mm width of each substrate and a piece of 25 mm width cotton was weighted, and coated with the adhesive, using a brush. A weight of 2 kg was applied on the assembly during 2 seconds. Then assembly was dried during 24 H at room temperature, and weighted again to calculate the dry weight of adhesive coated.

Cotton was peeled from the substrate @ 180° C., 300 mm/min, in a mechanical testing machine (Model 1122 Serie IX, Instron Corporation).

All adhesion results were expressed in cN/cm/g of dry adhesive.

Delamination Measurement Protocol

This test assesses the effectiveness of the adhesive in providing a good adhesion to paper and to evaluate the time needed for paper sheets to be permanently bonded.

The test was made on paper supplied from Meerssen & Palm (Favini Group), Flying Colours Range, Daffodil colour. A sample (21 cm long×3 cm wide) of this paper was coated with a 100 micron thick layer of adhesive. Another sample, same size, of this paper was applied on the adhesive. A 2 kg rubber roll pressure was applied to the assembly for 2 seconds. After 45 minutes, the assembly was separated. If delamination has occurred then the delamination test provides a "YES". If delamination has not occurred then the delamination test provides a "NO".

Wrinkle Evaluation Protocol

When a liquid, water soluble glue is applied on paper, the distortion that immediately occurs evolves with time, to reach a final, permanent distortion. Given the initial evolution as a function of time, only the final, permanent distortion is evaluated (when the adhesive has been dried).

The test was made on a paper supplied from Meerssen & Palm (Favini Group), Flying Colours Range, Daffodil colour which must have stayed in the test room for at least 24 H before the test was conducted.

Figure 1B:
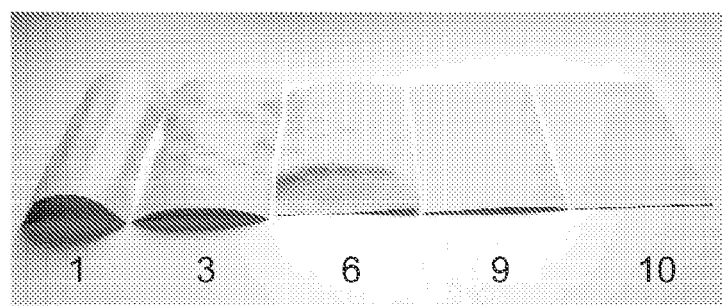

A sample (21 cm long×14 cm wide) was coated with a 50 & 100 microns thick layer of adhesive, as described in FIG. 1A (the adhesive coating is shown by 1 in FIG. 1A). A standard Scotch® Removable Magic™ Tape (811), 50 microns thick, supplied from 3M Company, was applied to each area which is not intended to receive adhesive (mask) before coating. Adhesive was then coated manually, with a bar. The mask was then removed just after the adhesive was coated, and specimens are dried during 24 H at room temperature onto a flat surface. Samples were turned over (coated side downwards) just before evaluation and final distortion was qualified by the average gap between the flat surface and the sample. Given that the distortion essentially depends upon the nature of the glue (can be curl or waves, or more complex distortions), no measurements were taken but overall distortion was evaluated on a 0-10 scale basis, by comparison with reference specimens (10 was given for a flat paper, 1 was given to an important distortion), as shown in FIG. 1B (which shows distortion values of 1, 3, 6, 9 and 10).

Viscosity

Viscosity measurements were made using a Brookfield Viscometer, Model LVF, available from: Fullbrook Systems Limited, Unit 4, Bourne End Mills Ind Est, Upper Bourne End Lane, Hemel Hempstead, Herts, HP1 2UJ. For low viscosities, Spindle 3 was used at 30 revolutions per minute (rpm); for high viscosities, Spindle 4 was used at 60 rpm. All liquids were Newtonian fluids. Viscosity is expressed in units: MPa·s.

Example 1

Delamination and Wrinkle Analysis

A wrinkle analysis was initially performed on conventional polymer containing adhesives (e.g. PVP/VA, PAM, PVP and PVA) and the results are shown in Table 1.

TABLE 1

Results of wrinkle analysis with adhesives containing conventional polymers

| Polymer | % Solid Content | Glass Transition (Tg) | Wrinkles 50 μm | Wrinkles 100 μm |
|---|---|---|---|---|
| PVP/VA | 50 | 114° C. | 1 | 0 |
| PVP K30 | 30 | 160° C. | 1 | 0.5 |
| PVP K115 | 15 | 160° C. | 6 | 2.5 |
| PVA | 21 | 358° C. | 3 | 3 |
| PAM | 40 | — | 1 | NT |

The results of this analysis demonstrated that there does not appear to be a correlation between the solid content of the polymer within the adhesive and the distortion of the paper substrate. For example, high solid content of PVP/VA and PAM demonstrated equally distorted paper substrate. Furthermore, there does not appear to be a correlation between glass transition (Tg) and wrinkle formation. Low glass transition values are generally possessed by polymers with enhanced flexibility.

Adhesives comprising a variety of compositions of AQ polymers (AQ5, AQ50, AQ200 and AQ500) were also analysed for viscosity, wrinkle formation and delamination and the results are shown in Table 2.

TABLE 2

Results of viscosity, wrinkle and delamination analysis with adhesives containing AQ polymers

| % Composition | | | | % Solid | | Wrinkles | | |
|---|---|---|---|---|---|---|---|---|
| AQ 5 | AQ 50 | AQ 200 | AQ 500 | Content | Viscosity | 50 μm | 100 μm | Delamination |
| 100 | 0 | 0 | 0 | 50.1 | 2300 | 7 | 9 | YES |
|  |  |  |  | 55.2 | 5100 | 7 | 7 |  |
|  |  |  |  | 60.4 | 12200 | 9 | 9 |  |
|  |  |  |  | 65.2 | 29000 | 10 | 10 |  |
| 0 | 100 | 0 | 0 | 30.3 | 400 | NT | 7 |  |
|  |  |  |  | 35.5 | 800 | NT | 7.5 |  |
|  |  |  |  | 40.0 | 1700 | NT | 8 |  |
|  |  |  |  | 44.4 | 2600 | NT | 8 |  |
|  |  |  |  | 50.0 | 8200 | 8.5 | 8 |  |
|  |  |  |  | 55.5 | 21500 | 7 | 7.5 |  |
|  |  |  |  | 64.9 | 88000 | NT | 10 |  |
| 25 | 75 | 0 | 0 | 50.3 | 7200 | 8 | NT |  |
|  |  |  |  | 54.7 | 13200 | 7 | NT |  |
| 50 | 50 | 0 | 0 | 50.5 | 4650 | 7.5 | 8 |  |
|  |  |  |  | 54.6 | 9300 | 7 | 7 |  |
| 75 | 25 | 0 | 0 | 50.4 | 3650 | 8 | NT |  |
|  |  |  |  | 54.7 | 6800 | 8 | NT |  |
| 0 | 0 | 100 | 0 | 29.9 | 3000 | NT | NT | YES |
|  |  |  |  | 35.2 | 6500 | NT | 5 |  |
|  |  |  |  | 39.9 | 15500 | NT | 6 |  |

TABLE 2-continued

Results of viscosity, wrinkle and delamination analysis with adhesives containing AQ polymers

| % Composition | | | | % Solid | | Wrinkles | | |
|---|---|---|---|---|---|---|---|---|
| AQ 5 | AQ 50 | AQ 200 | AQ 500 | Content | Viscosity | 50 μm | 100 μm | Delamination |
| | | | | 44.2 | 35000 | NT | 6 | |
| | | | | 50.2 | 78000 | NT | 7 | |
| 0 | 0 | 0 | 100 | 24.0 | 3800 | NT | NT | YES |

NT = not tested

From the results in Table 2 it appears that generally, all concentrations of AQ polymers of varying molecular weight demonstrated good wrinkle prevention and only low concentrations of AQ polymer (below 30 wt %) caused distortion of the paper substrate. Optimal results were observed with a high concentration of low molecular weight AQ polymer (e.g. above 50 wt % of AQ5 and AQ50) which demonstrated minimal paper distortion. Furthermore, it would appear that the quantity of adhesive (50 μm or 100 μm) had no significant influence on the distortion of the paper substrate.

Figure 2:
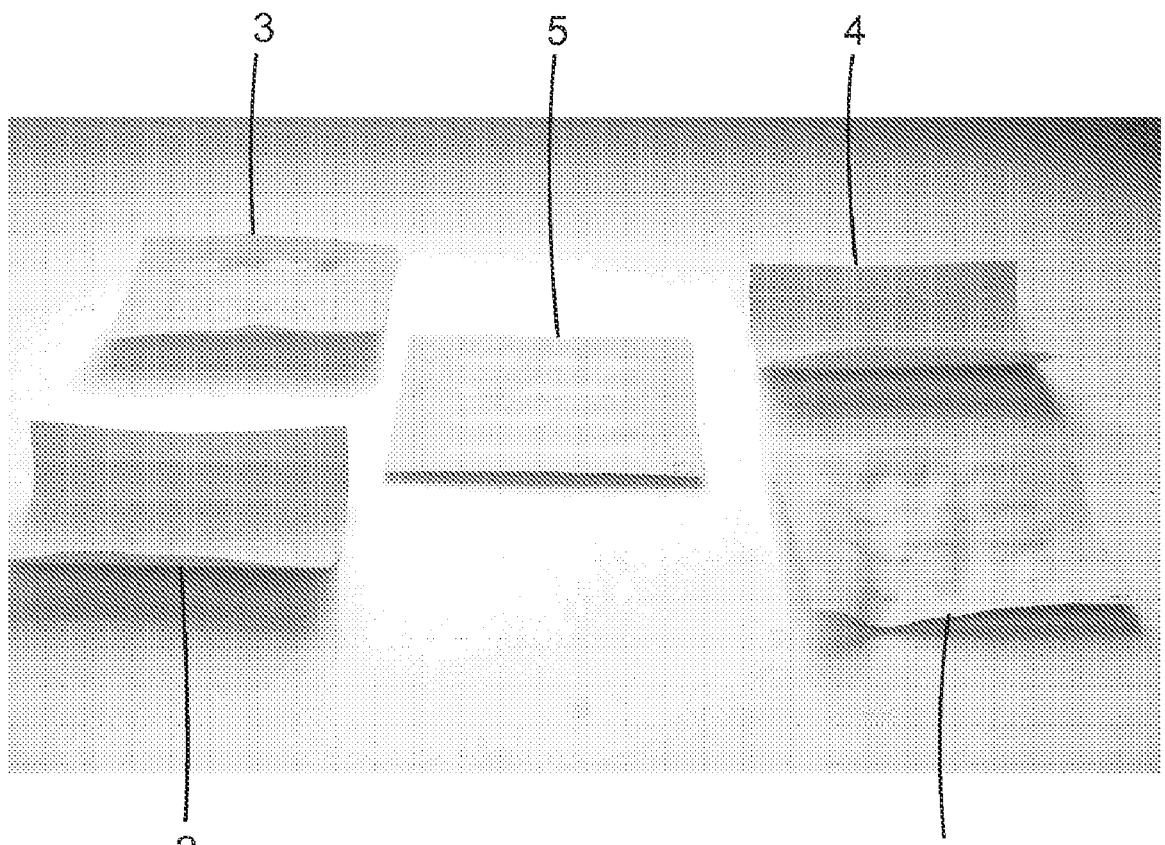
FIG. 2 shows the results of wrinkle analysis with adhesives containing polyethyloxazoline polymers and conventional polymers.

FIG. 2 graphically depicts the results of the wrinkle analysis with adhesives containing AQ polymers (AQ 5 at 60% solids (shown as 5 in FIG. 2)) and comparative polymers (2 represents 50 wt % PVP/VA, 3 represents 21 wt % PVA, 4 represents 30 wt % PVP and 6 represents 15 wt % PVP). The significant wrinkle free properties of the AQ polymers can be observed from FIG. 2 when compared with the distortions caused by comparative adhesives.

Example 2

Adhesion Analysis

Figure 3:
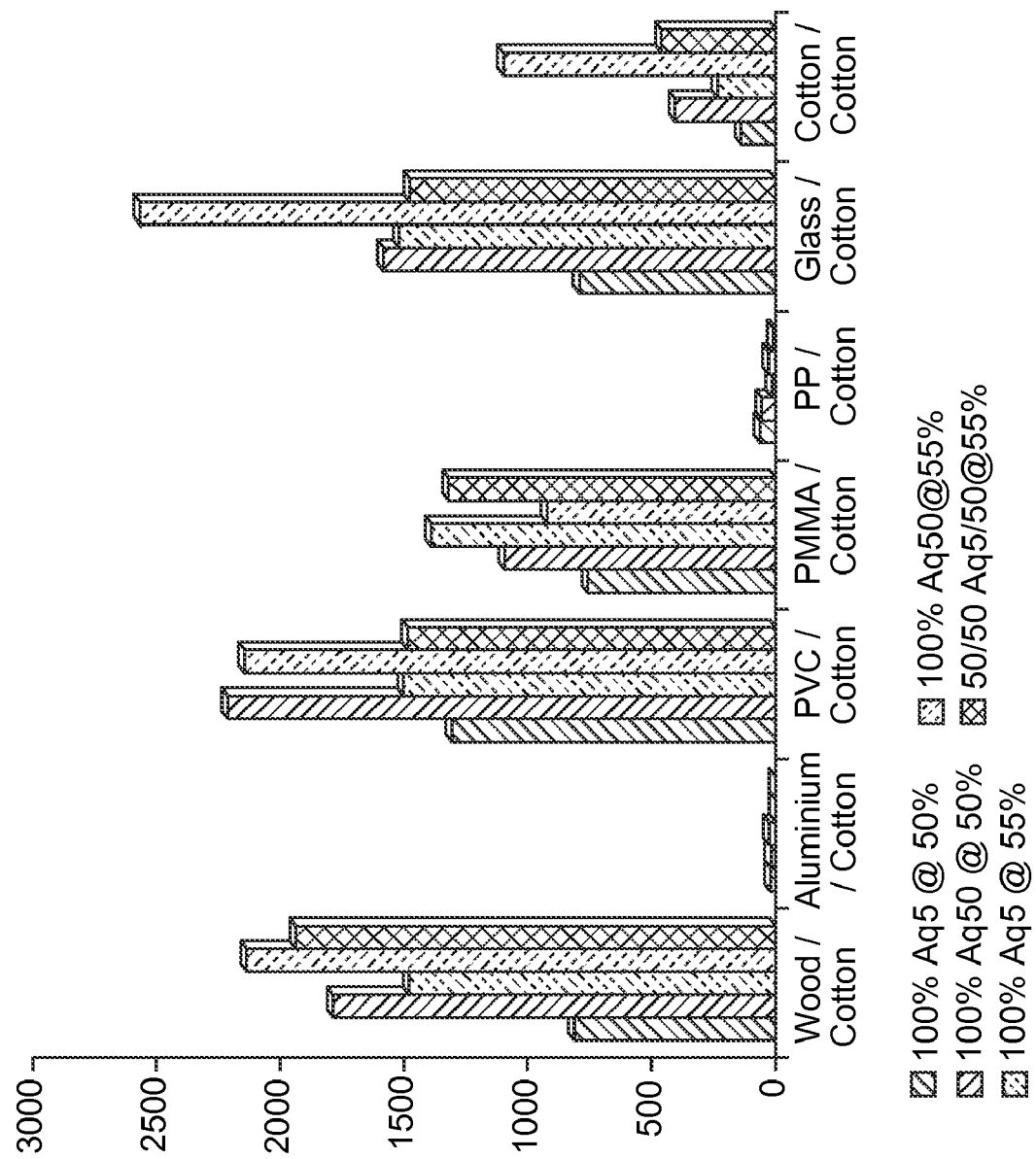
FIG. 3 shows a graphical representation of the results of the adhesion analysis obtained in Table 3.

An adhesion analysis was performed on a variety of differing adhesives according to the invention. Adhesives comprising 50 wt % AQ5 and AQ50, 55 wt % AQ5 and AQ50 and 55 wt % AQ5/AQ50 (50/50 mixture) were used in this analysis. The results are shown in Table 3 (and graphically represented in FIG. 3) which indicates generally that adhesives comprising the higher molecular weight polymer AQ50 demonstrated greater adhesion than the lower molecular weight polymer AQ5. Furthermore, adhesives comprising a higher solid content percentage of AQ polymer (e.g. 55 wt %) generally demonstrated greater adhesion than the lower solid content percentage (e.g. 50 wt %).

TABLE 3

Results of Adhesion Analysis using AQ5 and AQ50

| | Wood/ Cotton (A) | Aluminium/ Cotton (B) | PVC/ Cotton (C) | PMMA/ Cotton (D) | PP/ Cotton (E) | Glass/ Cotton (F) | Cotton/ Cotton (G) |
|---|---|---|---|---|---|---|---|
| 100% AQ5 @ 50 wt % | 812 | 19 | 1306 | 758 | 62 | 792 | 139 |
| 100% AQ50 @ 50 wt % | 1785 | 18 | 2212 | 1094 | 54 | 1584 | 405 |
| 100% AQ5 @ 55 wt % | 1479 | 24 | 1503 | 1391 | 14 | 1519 | 233 |
| 100% AQ50 @ 55 wt % | 2134 | 0 | 2144 | 923 | 28 | 2566 | 1099 |
| 50/50 AQ5/AQ50 @ 55 wt % | 1937 | 0 | 1484 | 1319 | 10 | 1476 | 462 |

What is claimed is:

1. A method of applying an adhesive to a paper substrate, the method comprising applying a liquid, water-soluble adhesive composition to the paper substrate, said liquid, water-soluble adhesive composition comprising an adhesive polymer dissolved in water and said adhesive polymer comprising a polyethyloxazoline; wherein the total amount of polyethyloxazoline polymer in the water-soluble adhesive composition is from 52 wt % to 70 wt % based on the total weight of water-soluble adhesive composition.

2. The method of claim 1, wherein the polyethyloxazoline has a molecular weight of 500,000 Da or less.

3. The method of claim 1, wherein the adhesive has a viscosity of from 5,000 to 50,000 MPa·s.

4. A liquid, water-soluble adhesive composition comprising adhesive polymer dissolved in water, wherein the adhesive polymer comprises one or more polyethyloxazolines in an amount of more than 50 wt % and up to 70 wt % based on the total weight of the water-soluble adhesive composition.

5. The adhesive of claim 4, wherein the adhesive polymer is present at a level of from 52 wt % to 70 wt %.

6. The adhesive of claim 4, wherein the adhesive polymer has a molecular weight of 500,000 Da or less.

7. The adhesive of claim 4, wherein the adhesive has a viscosity of from 5,000 to 50,000 MPa·s.

8. An adhesive product comprising (i) a dispenser having a nozzle and (ii) the adhesive of claim 4, wherein the adhesive is contained within the dispenser.

9. The adhesive product of claim 8, wherein the nozzle has a perforation of from 0.5 to 3 mm for dispensing the adhesive.

10. The adhesive product of claim 8, wherein the nozzle has a flat surface for applying the dispensed adhesive onto a surface.

11. A method of producing a liquid, water-soluble adhesive composition as defined in claim 4, the method comprises dissolving one or more polyethyloxazolines in water, wherein the polyethyloxazolines are added so as to be present in the liquid, water-soluble adhesive composition in a total amount of over 50 and up to 70 wt % based on the total weight of water-soluble adhesive composition.

* * * * *

UNITED STATES PATENT AND TRADEMARK OFFICE
CERTIFICATE OF CORRECTION

PATENT NO.         : 8,119,732 B2                                  Page 1 of 1
APPLICATION NO.    : 12/296436
DATED              : February 21, 2012
INVENTOR(S)        : Aline Hanrot It is certified that error appears in the above-identified patent and that said Letters Patent is hereby corrected as shown below:

Title Page Column 1 (Inventor)
Item (75), delete "Clidry" and insert -- Clichy --, therefor.

Title Page Column 2 (Abstract)
Line 7, delete "A" and insert -- a --, therefor.

Column 2
Line 43 (approx.), delete "(PEOX;" and insert -- (PEOx; --, therefor.

Column 4
Lines 16 – 17, delete "Speciality" and insert -- Specialty --, therefor.

Line 21, delete "Cedez," and insert -- Cedex, --, therefor.

Line 44, delete "Serie" and insert -- Series --, therefor.

Signed and Sealed this
Twelfth Day of February, 2013

Teresa Stanek Rea
*Acting Director of the United States Patent and Trademark Office*